(12) United States Patent
Muilwyk (10) Patent No.: US 6,471,461 B2
(45) Date of Patent: Oct. 29, 2002

(54) ADJUSTABLE POSITION SLIDE FOR TRANSPORTING ARTICLES

(75) Inventor: Edward Muilwyk, Bellville, OH (US)

(73) Assignee: Designed Metal Products, Inc., Mansfield, OH (US)

( * ) Notice: Subject to any disclaimer, the term of this patent is extended or adjusted under 35 U.S.C. 154(b) by 0 days.

(21) Appl. No.: 09/779,923

(22) Filed: Feb. 8, 2001

(65) Prior Publication Data

US 2002/0106270 A1 Aug. 8, 2002

(51) Int. Cl.[7] ................................................ B65G 1/00
(52) U.S. Cl. ..................... 414/276; 414/397; 414/793.8; 414/794.6; 193/15; 193/17; 108/69; 108/80; 108/134
(58) Field of Search ................................ 414/397, 276, 414/794.6, 793.8; 193/3, 15, 17; 108/80, 69, 134

(56) References Cited

U.S. PATENT DOCUMENTS

| | | | |
|---|---|---|---|
| 51,727 A | 12/1865 | Johnson | |
| 330,100 A | * 11/1885 | Ellyson | ........................ 108/69 |
| 380,366 A | 4/1888 | Trapp | |
| 572,391 A | * 12/1896 | Whitford | ........................ 108/69 |
| 596,975 A | 1/1898 | Bent | |
| 743,344 A | 11/1903 | Souder et al. | |
| 823,580 A | * 6/1906 | Bullock | ........................ 108/69 |
| 878,252 A | 2/1908 | Stowe | |
| 881,492 A | 3/1908 | Schiller | |
| 882,605 A | * 3/1908 | Young | ........................ 193/17 |
| 1,259,227 A | * 3/1918 | Gross | ........................ 193/17 |
| 2,208,208 A | * 7/1940 | Brooks | .................... 414/397 X |
| 2,579,783 A | * 12/1951 | Branto | .................... 108/134 X |
| 3,249,073 A | 5/1966 | Gorham | |
| 3,387,882 A | 6/1968 | Mycue | |
| 3,615,088 A | 10/1971 | Compton | |
| 3,672,312 A | * 6/1972 | Pettit et al. | ....................... 108/69 |
| 3,940,181 A | 2/1976 | Cheek, Jr. | |
| 4,640,326 A | * 2/1987 | Hewitt | .................... 108/134 X |
| 5,255,724 A | * 10/1993 | Butke | ............................ 144/329 |
| 5,555,819 A | 9/1996 | Lichridge | |
| 5,642,803 A | 7/1997 | Tanaka | |
| 5,669,314 A | * 9/1997 | Grant | ........................ 108/80 X |
| 5,697,753 A | * 12/1997 | Aurora et al. | ................ 414/398 |
| 5,730,068 A | 3/1998 | Rioux, Jr. | |
| RE36,638 E | 4/2000 | Herman | |
| 6,062,648 A | 5/2000 | Adler | |

FOREIGN PATENT DOCUMENTS

SE     131212     * 3/1951     ............... 414/794.6

* cited by examiner

*Primary Examiner*—Steven A. Bratlie
(74) *Attorney, Agent, or Firm*—Renner, Otto, Boisselle & Sklar, LLP

(57) ABSTRACT

An adjustable sliding assembly. The sliding assembly includes an article sliding surface, the sliding surface having a proximal end pivotally connectable to a work surface and a free distal end; and a support member pivotally connected to the sliding surface between a midpoint of the sliding surface and the distal end of the sliding surface, the support member selectively holding the sliding surface in one of a plurality of inclinations and being actuated to progressively adjust the height of the distal end of the sliding surface in correspondence to the plurality of inclinations. Also disclosed are methods of stacking articles using the sliding assembly.

23 Claims, 4 Drawing Sheets

ADJUSTABLE POSITION SLIDE FOR TRANSPORTING ARTICLES

TECHNICAL FIELD

The present invention generally relates to transporting articles from a first location to a second location, and, more particularly, to an adjustable sliding assembly which connects to a work surface and a method of stacking articles using the adjustable sliding assembly.

BACKGROUND ART

Parts manufacturers typically package multiple parts in a single container. Multiple containers are then arranged on a pallet for storage or shipment to a customer.

For example, in the course of stacking the containers on the pallet, a worker loads a first container while the first container is place on top of a work surface, such as a table top. After the first container is loaded and sealed, the worker lifts the container off of the work surface and moves the container (including, perhaps, lowering the container) onto the pallet. Subsequent containers are then loaded, sealed and stacked on top the first container. Over the course of time, the raising, carrying and lowering required to move and stack the containers on the pallet can become inconvenient and time consuming for the worker.

Therefore, there exists a need in the art for an apparatus for and a method of stacking articles which originate on a work surface that simplifies the foregoing process.

SUMMARY OF THE INVENTION

According to one aspect of the invention, the invention is an adjustable sliding assembly. The sliding assembly includes an article sliding surface, the sliding surface having a proximal end pivotally connectable to a work surface and a free distal end; and a support member pivotally connected to the sliding surface between a midpoint of the sliding surface and the distal end of the sliding surface, the support member having a plurality of engagement surfaces for engaging a pawl and thereby selectively holding the sliding surface in one of a plurality of inclinations and adjusting the height of the distal end of the sliding surface.

According to another aspect of the invention, the invention is an adjustable sliding assembly. The sliding assembly includes an article sliding surface, the sliding surface having a proximal end pivotally connectable to a work surface and a free distal end; and a support member pivotally connected to the sliding surface between a midpoint of the sliding surface and the distal end of the sliding surface, the support member selectively holding the sliding surface in one of a plurality of inclinations and being actuated to progressively adjust the height of the distal end of the sliding surface in correspondence to the plurality of inclinations.

According to another aspect of the invention, the invention is a table assembly. The table assembly includes a table having a work surface; and an adjustable sliding assembly, the sliding assembly including an article sliding surface, the sliding surface having a proximal end pivotally connected to an edge of the work surface and a free distal end; and a support member pivotally connected to the sliding surface between a midpoint of the sliding surface and the distal end of the sliding surface, the support member selectively holding the sliding surface in one of a plurality of inclinations and being actuated to progressively adjust the height of the distal end of the sliding surface in correspondence to the plurality of inclinations.

According to yet another aspect of the invention, the invention is a method of stacking articles. The method includes the steps of adjusting an inclination of a sliding surface pivotally connected at a proximal end to and an edge of a work surface to a first position such that a distal end of the sliding surface has a first elevation; sliding a first article disposed on the work surface across the sliding surface and onto a receiving surface; readjusting the inclination of the sliding surface such that the distal end of the sliding surface has a second elevation; and sliding a second article disposed on the work surface across the sliding surface and onto the first article.

According to still another aspect of the invention, the invention is a method of stacking articles. The method includes the steps of adjusting an inclination of a sliding surface pivotally connected at a proximal end to and an edge of a work surface to a first position such that a distal end of the sliding surface has a first elevation; sliding a first article disposed on the work surface across the sliding surface and onto a proximal side of a receiving surface; sliding the first article to a distal side of the receiving surface; sliding a second article disposed on the work surface across the sliding surface and onto the proximal side of the receiving surface; readjusting the inclination of the sliding surface such that the distal end of the sliding surface has a second elevation; and sliding a third article disposed on the work surface across the sliding surface and onto the second article.

BRIEF DESCRIPTION OF DRAWINGS

These and further features of the present invention will be apparent with reference to the following description and drawings, wherein.

DISCLOSURE OF INVENTION

In the detailed description which follows, identical components have been given the same reference numerals, regardless of whether they are shown in different embodiments of the present invention. To illustrate the present invention in a clear and concise manner, the drawings may not necessarily be to scale and certain features may be shown in somewhat schematic form. In is noted that the inventions described herein are described with respect to the exemplary environment of a parts manufacturer. However, the inventions can be used in a variety of settings.

Figure 1:
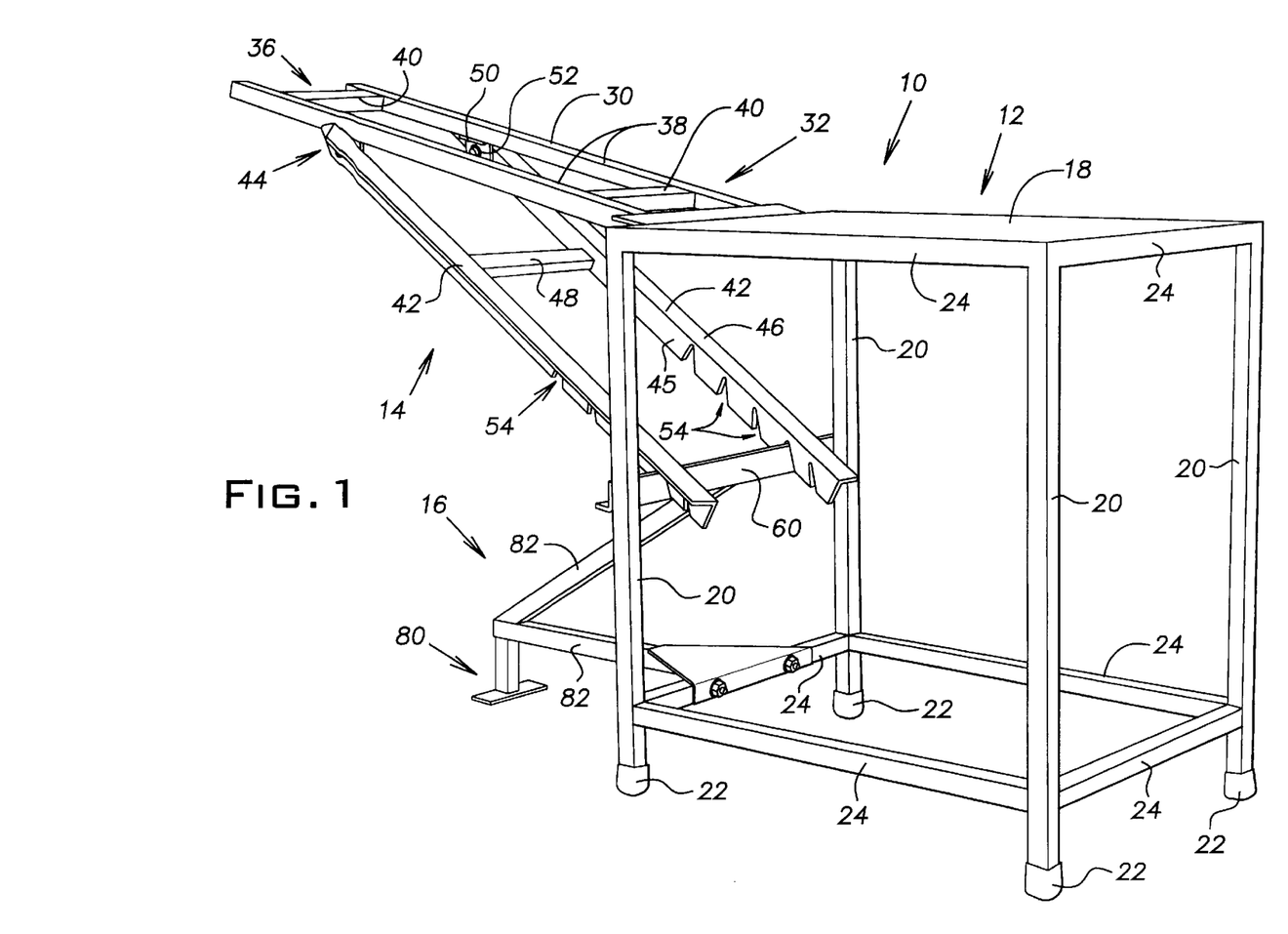
FIG. 1 is a perspective view of a table assembly which includes an adjustable sliding assembly according to the present invention.
Figures 2, 3:
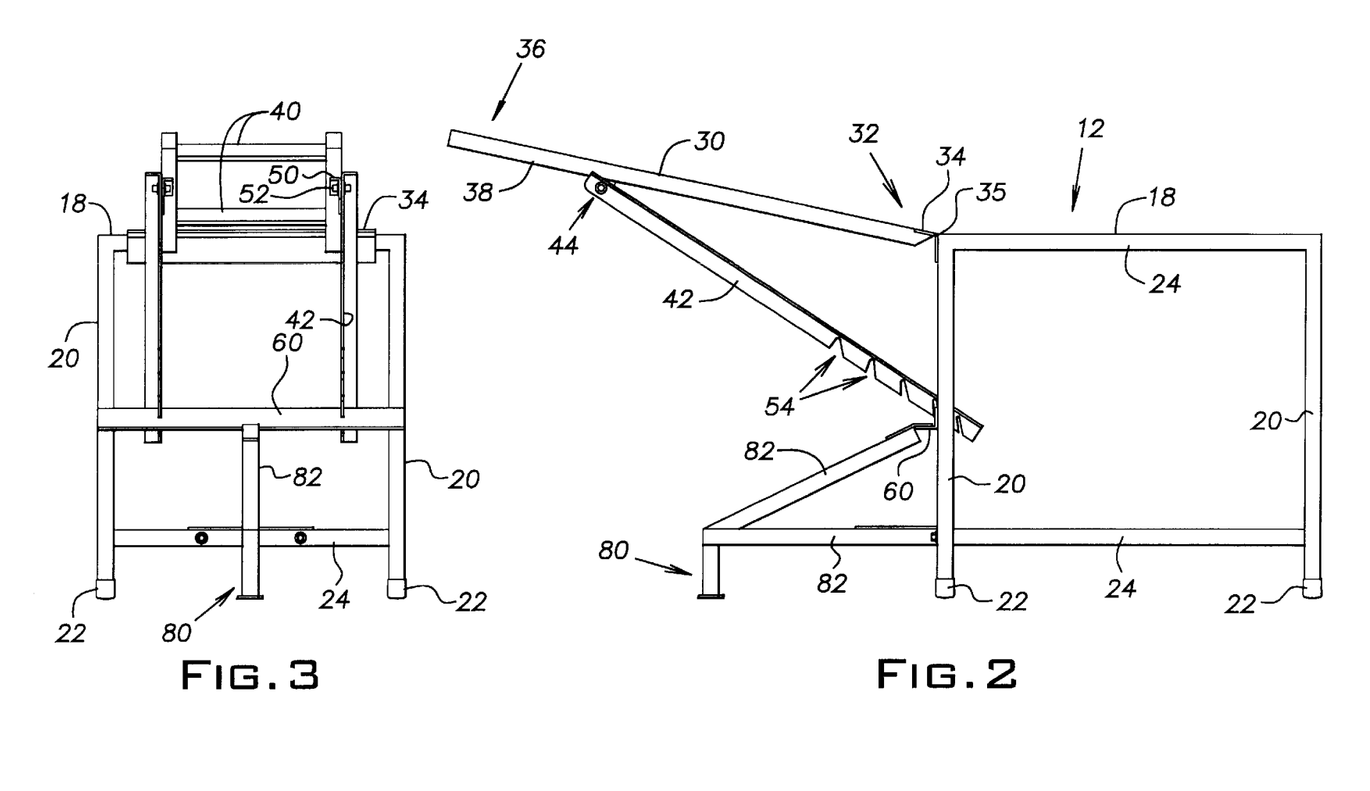
FIG. 2 is a side view of the table assembly illustrated in FIG. 1.
FIG. 3 is an end view of the table assembly illustrated in FIG. 1.

With reference to FIGS. 1 through 3, the present invention is directed to a device for transporting articles from one location to another. More particularly, the invention assists an individual when moving an article, such as a loaded container, from a table top to a pallet where other similar articles may be stacked. The figures illustrate a table assembly 10 which includes a table 12, an upwardly adjustable sliding assembly 14 and a stability assembly 16.

The table 12 can include, for example, a work surface area used for the processing or packaging of articles. For instance, a part manufacturer may manufacture parts using a metal stamping and machining apparatus. These parts are brought to the table 12 where an operator, or other machinery, assembles the parts and/or loads the parts into a container, perhaps along with other similar parts. Accordingly, the table 12 has a generally horizontal and planer work surface 18. The work surface 18 can receive subjacent support from a frame assembly which typically includes legs 20 with feet 22 for engaging a floor and various structural integrity members 24. Alternatively, the work surface 18 can be hung or supported by a cantilever arrangement.

The upwardly adjustable sliding assembly 14 has a sliding surface 30 for supporting an article or container as the article or container is moved from the work surface 18 to another location. The another location can include another work surface, an article receiving station or a pallet where multiple articles or containers are stacked for shipment, storage or further processing. The sliding surface 30 provides a plane along which the article or container is slid. The sliding surface 30 is pivotally connected to the work surface 18 at a proximal end 32 of the sliding surface 30 with a hinge 34 having a pivot point 35. The sliding surface 30 has a distal end 36 which freely swings in an upward or downward motion and can be held in a position lower than, even with or higher than the work surface 18 as described in more detail below. It is noted that the distal end 36 will swing through an arc as it is moved upward or downward due to the pivoting connection of the proximal end 32 to the work surface 18. It is also noted that the distal end 36 can be provided with an attachment mechanism to permanently or releasably attach the distal end 32 to another location, such as a second work surface or an article receiving station.

The sliding surface 30 is herein defined to mean any member along which an object, such as a container, can be moved from a first point to a second point. As illustrated, the sliding surface 30 includes a pair of spaced apart and generally parallel bars 38. The bars 38 each have a top surface. The top surfaces are each located in a plane to form the sliding surface 30. The bars 38 are connected by at least one cross member 40. The cross members 40 have a top surface which can be in the plane of the sliding surface 30 or disposed below the plane of the sliding surface 30. The cross members 40 connect the bars 38 so that each bar 30 moves with the other bar 38 if one of the bars 38 is moved. The cross members 40 also assist in minimizing twisting of the sliding surface 30 should an article being slid across sliding surface 30 be positioned or weighted to exert more force on one of the bars 38 with respect to the other bar 38.

As one skilled in the art will appreciate, the sliding surface 30 can include a variety of additional features or can be embodied in a variety of ways. For example, the sliding surface 30 can have continuous members extending from the proximal end 32 to the distal end 36 as illustrated or can be made from non-continuous members. Additionally, the sliding surface 30 can include one or more friction reduction mechanisms, such as bearings, wheels or rollers. Other friction reducing mechanisms include a Teflon coating or low friction strips, for example, a plastic member secured with an adhesive. Another exemplary friction reducing mechanism is a series of bumps or ribs having upper points disposed in a plane to form the sliding surface 30. The bumps or ribs reduce the contact surface area, and hence the friction, between the sliding surface 30 and the article or container being slid across the sliding surface 30.

The bars 38 can take on a number of various configurations. For example, the bars 38 can be hollow or solid rectangular beams as illustrated in FIGS. 1 through 3. Alternatively, the bars 38 can each be a round member, a flat strip, a member having an L-shaped cross section (e.g., an angle iron), a member having an I-shaped cross-section (e.g., an I-beam), or the like. As another alternative embodiment falling within the scope of the invention, the sliding surface 30 can be formed by a broad piece of material, such as sheet metal or a wood board. The components of the sliding surface 30 can be made from a metal, such as steel, iron, aluminum or the like, plastic, wood or any other similar material which is resistant to bending or breaking under a load.

The hinge 34 has a pair of metal leaves, each having interlocking knuckles joined by a pin which serves as the pivot point 35. One of the leaves is secured to the end of the work surface 18, for example, by welding the leaf to one of the structural integrity members 24 forming the frame of the table 12. Alternatively, the hinge can be secured to the table 12 with threaded fasteners, rivets or the like. The other leaf of the hinge 34 is secured to the sliding surface 30, for example, using welding, threaded fasteners, rivets, etc. To accommodate for the thickness of the leaf connected to the sliding surface 30, the bars 38 forming the sliding surface 30 can be machined to have grooves for receiving the leaf. In addition, the ends of the bars 38 at the proximal end 32 of the sliding surface 30 can be beveled as illustrated to allow for downward angling of the sliding surface 30. It is noted that the hinge 34 can take on a number of alternative configurations from the illustrated embodiment, including, for example, attaching the hinge to the bottom of the bars 38 or in a recess formed on top of the work surface 18. Other pivoting connections other than a hinge can be used. For example, a pivoting connection having a pin extending through holes in corresponding components of the sliding surface 30 and the table 12 can be employed.

The members making up the sliding surface 30 are supported by at least one support member 42. The support member 42 is pivotally connected to the sliding surface 30 with a pivoting connection 44. The pivoting connection 44 is connected to the sliding surface 30 between a midpoint of the sliding surface 30 (i.e., half the distance from the distal end 36 to the proximal end 32) and the free end, or distal end 36, of the sliding surface 30. Although the pivoting connection 44 can be located at the midpoint of the sliding surface 30 or between the midpoint of the sliding surface 30 and the proximal end 32 of the sliding surface 30, positioning the pivoting connection 44 between the midpoint of the sliding surface 30 and the distal end 36 provides enhanced support to the distal portion of the sliding surface 30 as a heavy load is slid from the work surface 18 to another location using the sliding surface 30. As one skilled in the art will appreciate, the support member 42 can take on a number of configurations. In the illustrated embodiment, two support members 42 are provided, one connected to each of the bars 38 with a pivoting connection 44.

The support members 42 of the illustrated embodiment have an L-shaped cross section with a downwardly projecting arm 45 and a outwardly projecting arm 46. The outwardly projecting arms 46 extend laterally in opposite directions towards front and rear portions of the table assembly 10 and, as described in more detail below, provide a lifting surface for an operator to position the sliding assembly 14. The support members 42 are spaced apart and connected to one another with at least one cross member 48. The cross member 48 allows each of the support members 42 to move together so that if one support member 42 is lifted the other support member 42 will move therewith.

Each of the pivoting connections 44 includes an angle iron 50 secured to a bottom of a sliding surface 30 using, for example, threaded fasteners or welding. Each pivoting connection 44 also includes a pin 52 which extends through corresponding holes 47 (FIG. 4) defined by the angle iron and the support member 42. The ends of the support member 42 adjacent the pivoting connection 44 can have beveled or radiused corners so as not to project above the plane of the sliding surface 30 and interfere with an article being slid across the sliding surface 30. One skilled in the art will appreciate that other pivoting connections 44 can be used, including, for example a hinge or any other mechanical linkage to provide the pivoting function described herein.

Figure 4:
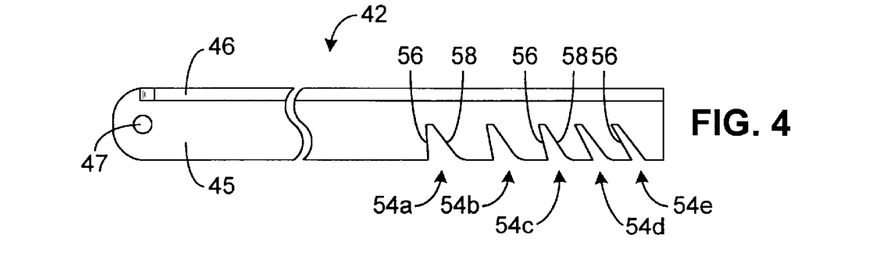
FIG. 4 is a side view of a support member component of the adjustable sliding assembly.

The downwardly projecting arm 45 of the support member 42 has a plurality of notches 54 formed therein. Each notch 54 is generally V-shaped and is defined by at least two surfaces, namely an engagement surface 56 and a ramp 58. Generally, the engagement surface 56 faces towards the table 12 and the ramp 58 faces away from the table 12 towards the distal end 36 of the sliding surface 30.

Figure 5A:
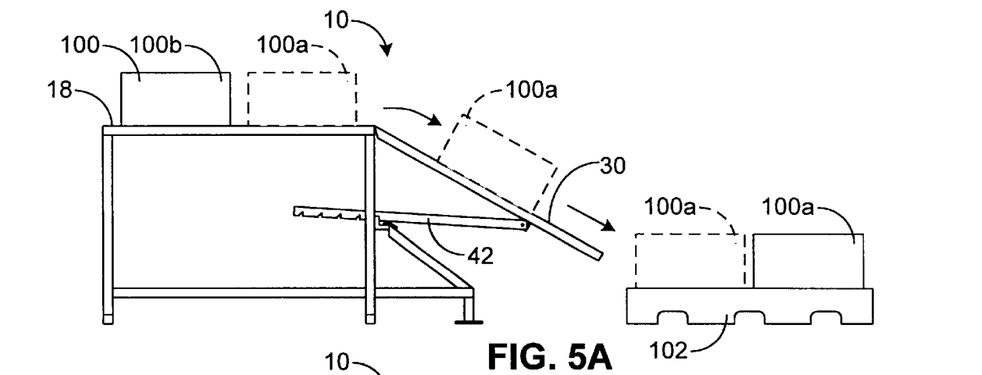
FIGS. 5A–5F illustrate a method of stacking articles using the adjustable sliding assembly.

The engagement surfaces 56 are positioned to engage a stationary pawl 60 and are positioned to progressively ratchet the sliding assembly 14 in an upward direction. More specifically, when a first notch 54a engages the pawl 60 the sliding surface 30 will have a downward slope extending from the work surface 18 towards the floor such as illustrated in FIG. 5A. By placing upward force on either the sliding surface 30 or the support member 42 near the pivoting connection 44, the ramp 58 will slide over the top of pawl 60. By continuing to exert such upward force, the support member 42 will continue to ride upward against the pawl 60 until reaching the second notch 54b. Upon reducing the upwardly applied force, the engagement surface 56 of the notch 54b will engage the pawl 60 to hold the sliding surface 30 at a position above the position as when the sliding surface 30 was supported by the support member 42 having the first notch 54a engaging the pawl 60. To progressively increase the height of the distal end 36, this procedure is repeated by progressively engaging the engagement surfaces 56 with the pawl 60 for the remaining notches 54c and up. It is noted that FIG. 4 illustrates five notches 54a–54e, however, less than or more than five notches can be provided on the support member 54 to provide for any desired number of height positions for the distal end 36 of the sliding surface 30.

In order to reduce the height of the distal end 36, upward force is placed on one of the support members 42 near the notches to disengage the engagement surface 56 with the pawl 60. Then the distal end 36 is downwardly pivoted about the pivot point 35 until a desired height is achieved and the engagement surface 56 of a desired notch 54 is engaged against the pawl 60 by lowering the support members 42.

Figure 5B:
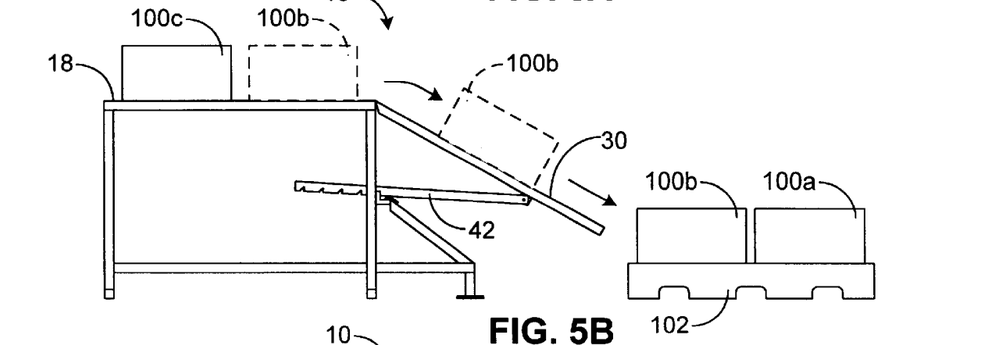
Figure 5C:
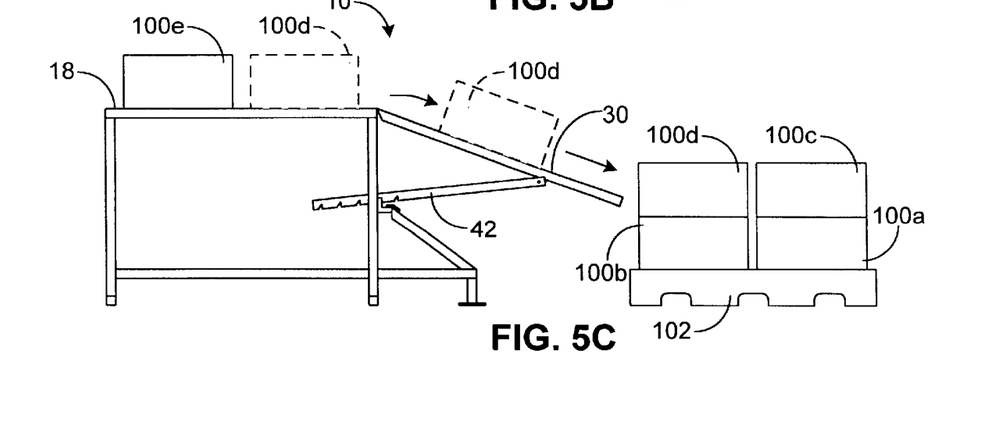

Generally, each engagement surface 56 is vertically oriented when in a position to engage the pawl 60. The engagement surfaces 56 are spaced apart to result in the progressive vertical positioning of the distal end 36. For example, if the sliding surface 30 is used to transport articles from the work surface 18 to a pallet where the articles are stacked upon one another, the first notch 54a can engage the pawl 60 such that the distal end 36 has a height roughly equivalent to the height of the pallet (e.g., as illustrated in FIG. 5A). To place a second article on top of the first article, the engagement surface 56 of the second notch 54b engages the pawl 60 to give the distal end 36 of the sliding surface 30 a vertical height generally equal to or slightly higher than the combined height of the first article and the pallet (e.g., as illustrated in FIG. 54C). The ramp 58 of each notch 54 is angled to reduce the upward force needed to raise the sliding assembly 14 from a lower position to a higher position.

In the illustrated embodiment, the pawl 60 is made from a horizontally disposed L-shaped member secured at its ends to legs 20 of the table 12. The pawl 60 can be secured to the legs 20 using, for example, fasteners or welding. One skilled in the art will appreciate that the pawl 60 can take on a number of alternative configurations such as, for example, a flat bar, a circular shaft or the like. In the illustrated embodiment, the pawl 60 has a vertical stop surface upon which the engagement surfaces 56 engage to make a line contact.

The illustrated embodiment of the sliding assembly 14, including the sliding surface 30 and the support members 42, are exemplary and other arrangements for the sliding assembly 14 are contemplated to fall within the scope of the claims appended hereto. For example, one support member 42 connected to a cross member 40 can be provided. In another embodiment, a handle can be provided on one of the bars 38 and/or one of the support members 42 to assist a user in positioning the sliding assembly 14.

In another alternative embodiment, the support member 42 is provided with a plurality of holes used to retain a spring biased pin located on the frame of the table 12.

In another alternative, a wheel can be rotatably secured to the table 12 and the support member 42 can be actuated by rotation of the wheel. The wheel can be turned, for example with a motor or a crank connected to a manually operated handle. The wheel and support member 42 can engage one another using interlocking teeth. In addition, the wheel can be provided with teeth to engage a spring biased pawl 60 to provide the ratcheting type function described above. A clutch or dogs can be provided to allow for reverse movement of the sliding assembly 14.

As another alternative, the support member 42 can be configured as a piece of rigid sheet stock, such as heavy gauge sheet metal, with an edge secured along the sliding surface 30. The sheet stock can have a plurality of holes disposed in an arc. The holes are selectively positioned to engage a spring biased pin disposed on the table 12. To position the sliding surface 30, the pin is disengaged from the hole and upward or downward force is placed on the sliding surface 30 such that a different hole is positioned in the path of the pin and the pin is reinserted through the hole to lock the sliding assembly 14 in place.

In yet another embodiment, a piston or hydraulic mechanism is used to raise or lower the sliding surface 30. A threaded rod connected to a motor can also be used.

In the foregoing alternative embodiments, the actuation of the motor or hydraulic mechanism can be controlled using a control circuit. The control circuit can receive commands in the form of electrical signals from up and down buttons which are used by an operator to set the height of the distal end 36 as desired. The control circuit can include a microprocessor programmed with preprogrammed stopping points for the sliding assembly 14. For example, each time the operator wishes to raise the distal end 36 to a higher elevation, the operator can depress the up button once and the controller will control the movement of the support member 42 to raise the distal end 36 to the next preprogrammed height. The down button can be used to reduce the height of the distal end 36 incrementally or all the way to a first preprogrammed height. Such input buttons can be placed on or near the work surface 18 or incorporated into a foot pedal.

A stop mechanism can be used to minimize the ability of a worker to position the distal end 36 too high or too low. For example, in the illustrated embodiment, if the distal end 36 is raised too high the support members 42 could slide past the pawl 60 and allow the support member 42 to swing freely. Stop mechanisms to minimize this possibility include, for example, a downwardly projecting member secured to the support member 42 adjacent the last notch 54 to engage the side of the pawl 60 facing the table 12. Other mechanisms include providing two engagement surfaces on the last notch 54 rather than a ramp 58. The first engagement surface 56 would engage the pawl 60 as described above and the second engagement surface would engage the opposite side of the pawl 60 to minimize additional upward movement of the sliding assembly 14.

Another alternative mechanism includes attaching one end of a cable to the underside of the work surface 18, or another part of the table 12, and the other end of the cable to the support member 42. The cable would have a length to prevent 30 further upward rotation of the sliding assembly 14 after the last notch 54 engages the pawl 60. Another alternative mechanism includes placing a limiting stop at the pivoting connection 44. As one skilled in the art will appreciate, stops or other engagement members can be provided on the support member 42 between the pivoting connection 44 and the first notch 54a to limit the downward rotation of the sliding assembly 14.

In another alternative embodiment of the sliding assembly 14, the sliding surface 30 includes telescoping members to extend the length of the sliding surface 30 between the proximal end 32 and the distal end 36. Securements, such as a spring bias pin or threaded fasteners, can be used to hold the telescoping members of the sliding surface 30 in place with respect to one another.

Many of the articles transported along the sliding surface 30 may have a considerable weight. Depending on the inclination and length of the sliding surface 30, the moment caused by an article sliding across the sliding surface 30 may urge the table 12 to rotate about the feet 22 located under the proximal end 32 of the sliding surface 30. In order to reduce the risk of the table 12 rotating about its feet 22, the table 12 can be bolted or otherwise secured to the floor, a wall or other support member. Alternatively a counter weight can be secured to the table 12 opposite the sliding assembly 14.

In the illustrated embodiment, a stabilizing assembly 16 is secured to the table 12 under the sliding assembly 14. The stabilizing assembly 16 includes a foot 80 which engages the floor and is horizontally spaced away from the proximal end 32 of the sliding surface 30 as illustrated. The foot 80 is secured to the table by members 82. One of the members 82 is connected to one of the structural integrity members 24. The other member 82 is secured to the pawl 60 at an inclination to receive a compressive force as the moment caused by article increases. This force is transmitted to the floor via the foot 80. The stability assembly 16 can be secured to the table 12 and the pawl 60 using threaded fasteners, welding or a combination thereof.

Turning now to FIGS. 5A–5F, a method of transporting and stacking articles 100 is illustrated. In the illustrated embodiment, the articles 100 are containers in which are placed a plurality of parts for shipment. It is noted, however, that the articles 100 can be any item which an operator wishes to move from the work surface 18 to a receiving location. As an example, the items contained within the containers can be machined metal components and the containers can be rectangular plastic buckets with hinged lids. Accordingly, a loaded container could weigh a considerable amount, such as thirty pounds or more.

In the illustrated method, the articles 100 are moved from the work surface 18 to a pallet 102. However, the method can be adapted to move articles to other location, such as a floor, a conveyor belt assembly or another work surface.

Referring now to FIG. 5A, the sliding surface 30 is positioned at a downward angle from the work surface 18 so that a first article 100a can be slid from the work surface 18, along the sliding surface 30 and onto a pallet 102 as schematically illustrated. The sliding action generally includes applying horizontal force to the article 100. It may be desirable to control the velocity of the article 100 by holding and guiding the article 100 respectively when the sliding assembly 14 has a downward inclination. Once the first article 100a has been transported onto the pallet 102, the article 100a can be slid across the pallet 102 to make room for a second article 100b (FIG. 54B) being stacked on the pallet 102 next to the first article 100a.

It is noted that as the article 100a transitions from the sliding surface 30 to the pallet 10, the article 100a may drop slightly. In most situations, this will not hinder or adversely effect the article 100 transporting method. However, if a smoother transition is desired (e.g., for the handling of a fragile article) the pallet 102 can be placed closer to the table assembly 10 and the downward inclination of the sliding surface 30 can be adjusted by appropriately positioning the notches 54 in the support member 42 so that the distal end 36 of the sliding surface 30 contacts an upper surface of the pallet 102. As indicated above, however, the distal end 36 of the sliding surface 30 moves through an arc as the angle of the sliding surface 30 is increased. Accordingly, if the smoother transition between the sliding surface 30 and the pallet 102 described above is desired, horizontal adjustment of the pallet 102 and/or the articles 100 stacked thereon may be desirable as the angle of the sliding surface 30 is increased.

Turning to FIG. 5B, a second article 100b is slid from the work surface 18 30 along the sliding surface 30 and onto the pallet 102. The second article 100b comes to rest on top of the pallet 102 adjacent the first article 100a such that the top of each of the articles 100a and 100b have generally the same elevation.

Referring now to FIG. 5C, the sliding surface 30 has been raised as described above by placing upward force on the sliding surface 30 and/or the support member 42 such that the first notch 54a disengages the pawl 60 and the second notch 54b ratchets into place to engage the pawl 60. Next, a third article 100c is slid from the work surface 18, across the sliding surface 30 and onto the second article 100b. The third article is slid across the second article 100b to come to rest on top of the first article 100a. As illustrated, a fourth article 100d is then slid from the work surface 18, across the sliding surface 30 and onto the top of the second article 100b.

Figure 5D:
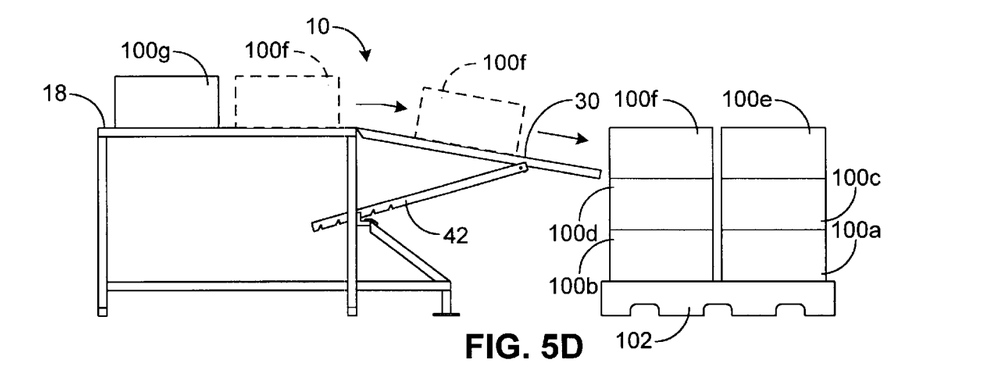

Referring now to FIG. 5D the foregoing steps are repeated to transport a fifth article 100e on top of the third article 100c and a sixth article 100f is placed on top of the fourth article 100d. More specifically, the angle of the sliding surface 30 is increased so that the distal end 36 is located at least as high as the top of the forth article 100d and the articles 100e and 100f are slid into place as described herein.

Figure 5E:
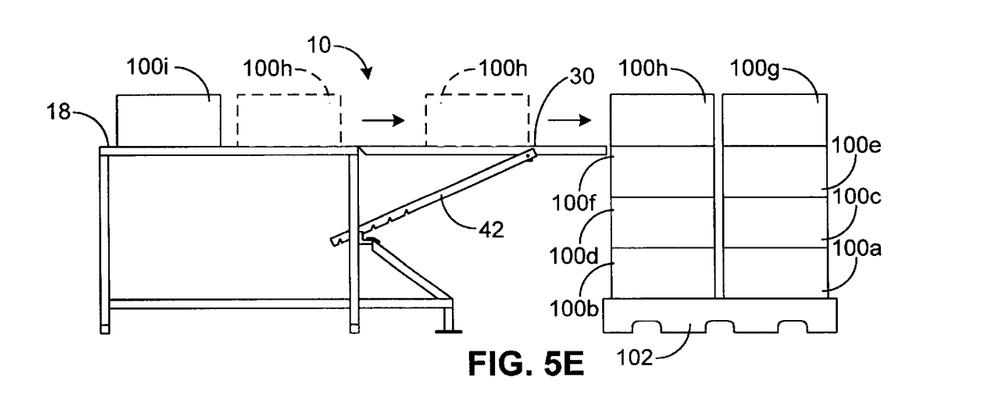

Referring now to FIG. 5E, seventh and eighth articles 100g and 100h are placed on top of the fifth and sixth articles 100e and 100f respectively, by first raising the inclination of the sliding surface 30 and sliding the articles 100g and 100h as described herein.

Figure 5F:
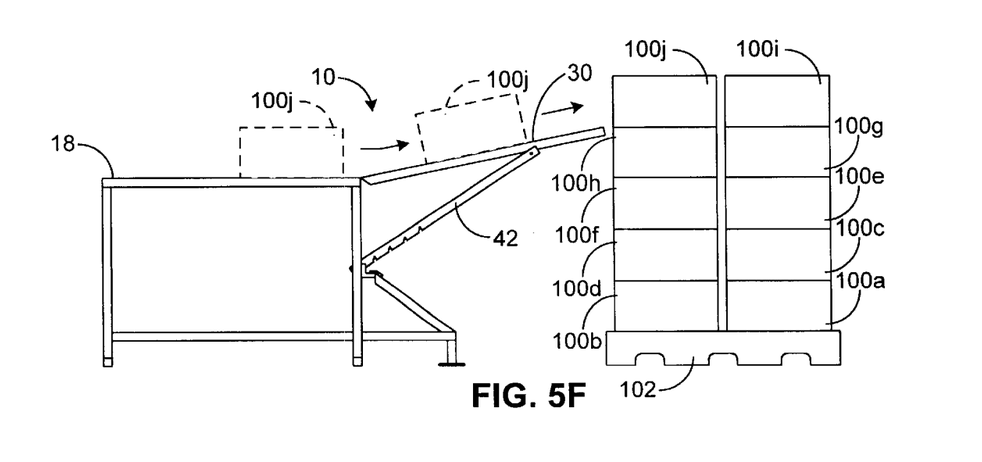

This process is repeated, as illustrated in FIG. 5F, for ninth and tenth articles 100i and 100j.

It is noted that less than or more than the illustrated five tiers of articles can be stacked onto a pallet 102. In a facility where uniformly sized articles 100 are routinely stacked, the notches 54 along the support member 42 can be positioned to result in the desired progressive vertical positioning of the distal end 36. It is also noted that depending on the width and length of both the articles 100 and the pallet 102, less than or more than the two illustrated columns of articles can be stacked on a pallet 102. In addition, the articles 100 can be stacked to overlap each other, for example, in similar fashion to bricks being arranged for the formation of a wall, or the articles 100 may have interlocking features to provide for stability once stacked on the pallet 102. After the articles 100 are stacked on the pallet 102, the articles 100 can be secured using a variety of methods such as bands, plastic wrapping and the like.

One skilled in the art will appreciate that the sliding surface can also be used to support articles 100 being slid from a remote location to the work surface 18. For example, a pallet 102 of containers received from a supplier can be off-loaded to the work surface 18 by reversing the method described above.

Although particular embodiments of the invention have been described in detail, it is understood that the invention is not limited correspondingly in scope, but includes all changes, modifications and equivalents coming within the spirit and terms of the claims appended hereto.

By way of example, more than one sliding assembly 14 can be connected to a work surface 18. Each sliding assembly 14 can be connected to the same edge of the work surface 18 or different edges of the work surface 18. In this arrangement, one sliding assembly 14 could be used to transport articles 100 to the work surface 18 and the other to transport articles 100 off of the work surface 18. Alternatively, the sliding assemblies 14 could be used to direct articles 100 to multiple locations.

What is claimed is:

1. An adjustable sliding assembly, comprising:
    an article sliding surface, the sliding surface having a proximal end pivotally connectable to a work surface and a free distal end, and the sliding surface is adapted to support an article as the article is slid from one of the ends to the other of the ends to transport the article with respect to the work surface; and
    a support member pivotally connected to the sliding surface between a midpoint of the sliding surface and the distal end of the sliding surface, the support member having a plurality of engagement surfaces for engaging a pawl and thereby selectively holding the sliding surface in one of a plurality of inclinations and adjusting the height of the distal end of the sliding surface.

2. The adjustable sliding assembly according to claim 1, wherein the support member has a plurality of notches, each notch forming one of the engagement surfaces and a ramp, the ramp riding over the pawl when upward force is placed on the sliding surface to ratchet a subsequent engagement surface into engagement with the pawl.

3. The adjustable sliding assembly according to claim 1 for use in sliding a plurality of articles each of which has substantially the same height, wherein each engagement surface is spaced apart from each adjacent engagement surface so that for each corresponding progressive upward adjustment of the height of the distal end of the sliding surface, the height of the distal end of the sliding surface is raised by approximately the height of one of the articles.

4. The adjustable sliding assembly according to claim 1, wherein the pawl is disposed under the proximal end of the sliding surface.

5. The adjustable sliding assembly according to claim 1, wherein the sliding surface includes a pair of spaced bars connected by at least one cross member.

6. The adjustable sliding assembly according to claim 5, wherein each bar has a support member pivotally connected thereto.

7. An adjustable sliding assembly, comprising:
    an article sliding surface, the sliding surface having a proximal end pivotally connectable to a work surface and a free distal end, and the sliding surface is adapted to support an article as the article is slid from one of the ends to the other of the ends to transport the article with respect to the work surface; and
    a support member pivotally connected to the sliding surface between a midpoint of the sliding surface and the distal end of the sliding surface, the support member selectively holding the sliding surface in one of a plurality of inclinations and being actuated to progressively adjust the height of the distal end of the sliding surface in correspondence to the plurality of inclinations.

8. The adjustable sliding assembly according to claim 7 for use in sliding a plurality of articles each of which has substantially the same height, wherein for each progressive upward adjustment of the height of the distal end of the sliding surface, the height of the distal end of the sliding surface is raised by approximately the height of one of the articles.

9. The adjustable sliding assembly according to claim 7, wherein the sliding surface includes a pair of spaced bars connected by at least one cross member.

10. A table assembly, comprising:
    a table having a work surface; and
    an adjustable sliding assembly, the sliding assembly including:
        an article sliding surface, the sliding surface having a proximal end pivotally connected to an edge of the work surface and a free distal end, and the sliding surface is adapted to support an article as the article is slid from one of the ends to the other of the ends to transport the article with respect to the work surface; and
        a support member pivotally connected to the sliding surface between a midpoint of the sliding surface and the distal end of the sliding surface, the support member selectively holding the sliding surface in one of a plurality of inclinations and being actuated to progressively adjust the height of the distal end of the sliding surface in correspondence to the plurality of inclinations.

11. The table assembly according to claim 10, wherein the support member has a plurality of engagement surfaces for engaging a pawl.

12. The table assembly according to claim 11, wherein the support member has a plurality of notches, each notch forming one of the engagement surfaces and a ramp, the ramp riding over the pawl when upward force is placed on the sliding surface to ratchet a subsequent engagement surface into engagement with the pawl.

13. The table assembly according to claim 11 for use in sliding a plurality of articles each of which has substantially the same height, wherein each engagement surface is spaced apart from each adjacent engagement surface so that for each corresponding progressive upward adjustment of the height of the distal end of the sliding surface, the height of the distal end of the sliding surface is raised by approximately the height of one of the articles.

14. The table assembly according to claim 11, wherein the pawl is disposed under the proximal end of the sliding surface.

15. The table assembly according to claim 10, wherein the sliding surface includes a pair of spaced bars connected by at least one cross member.

16. The table assembly according to claim 10, further comprising a stability assembly having a foot engaging a floor, the foot being horizontally spaced away from the table and disposed under the sliding surface, the foot connected to a frame supporting the work surface by an inclined member, the inclined member transferring at least a portion of a force exerted by the sliding assembly on the table to the floor via the foot.

17. A method of stacking articles, comprising the steps of:
adjusting an inclination of a sliding surface pivotally connected at a proximal end to an edge of a work surface to a first position such that a distal end of the sliding surface has a first elevation;
sliding a first article disposed on the work surface across the sliding surface and onto a receiving surface;
readjusting the inclination of the sliding surface such that the distal end of the sliding surface has a second elevation; and
sliding a second article disposed on the work surface across the sliding surface and onto the first article.

18. The method according to claim 17, wherein the receiving surface is a pallet.

19. A method of stacking articles, comprising the steps of:
adjusting an inclination of a sliding surface pivotally connected at a proximal end to an edge of a work surface to a first position such that a distal end of the sliding surface has a first elevation;
sliding a first article disposed on the work surface across the sliding surface and onto a proximal side of a receiving surface;
sliding the first article to a distal side of the receiving surface;
sliding a second article disposed on the work surface across the sliding surface and onto the proximal side of the receiving surface;
readjusting the inclination of the sliding surface such that the distal end of the sliding surface has a second elevation; and
sliding a third article disposed on the work surface across the sliding surface and onto the second article.

20. The method according to claim 19, further comprising the step of sliding the third article across the second article and onto the first article.

21. The method according to claim 20, further comprising the step of sliding a forth article disposed on the work surface across the sliding surface and onto the second article.

22. The method according to claim 19, wherein the receiving surface is a pallet.

23. The adjustable sliding assembly according to claim 2, wherein each engagement surface is planar and has a different angle with respect to a longitudinal axis of the support member such that each engagement surface establishes a planar engagement with a corresponding surface of the pawl when positioned to engage the pawl.

* * * * *

UNITED STATES PATENT AND TRADEMARK OFFICE
CERTIFICATE OF CORRECTION

PATENT NO.     : 6,471,461 B2
DATED          : October 29, 2002
INVENTOR(S)    : Muilwyk It is certified that error appears in the above-identified patent and that said Letters Patent is hereby corrected as shown below:

Column 7,
Line 18, delete "30".

Column 8,
Line 37, replace "1830" with -- 18 --.

Signed and Sealed this

Fourth Day of March, 2003

JAMES E. ROGAN
*Director of the United States Patent and Trademark Office*